United States Patent [19]

Ray

[11] Patent Number: 4,971,018
[45] Date of Patent: Nov. 20, 1990

[54] DIESEL FUEL HEATER
[75] Inventor: Dennis A. Ray, Crookston, Minn.
[73] Assignee: Diesel Research and Development Co., Crookston, Minn.
[21] Appl. No.: 188,304
[22] Filed: Apr. 29, 1988
[51] Int. Cl.⁵ .................. F02M 31/00; F02M 31/10
[52] U.S. Cl. .................................... 123/557; 123/545
[58] Field of Search .................... 123/557, 545, 547
[56] References Cited

U.S. PATENT DOCUMENTS

| | | | |
|---|---|---|---|
| 800,777 | 10/1905 | Westmacott | 123/545 |
| 1,067,582 | 7/1913 | Boyd et al. | 123/557 |
| 1,256,186 | 2/1918 | Planck | 123/557 |
| 2,197,236 | 4/1940 | Bowen et al. | 123/557 |
| 4,442,819 | 4/1984 | Veach | 123/557 |
| 4,722,314 | 2/1988 | Martinson | 123/557 |

*Primary Examiner*—Willis R. Wolfe
*Assistant Examiner*—M. Macy
*Attorney, Agent, or Firm*—Palmatier & Sjoquist

[57] ABSTRACT

A diesel fuel heater for heating diesel fuel prior to its introduction into the diesel engine wherein said fuel heater comprises top and bottom covers and an elongate annular section. The fuel heater of the present invention heats the fuel by passing engine coolant across fuel carrying fuel tubes located in the heat transfer chamber.

16 Claims, 4 Drawing Sheets

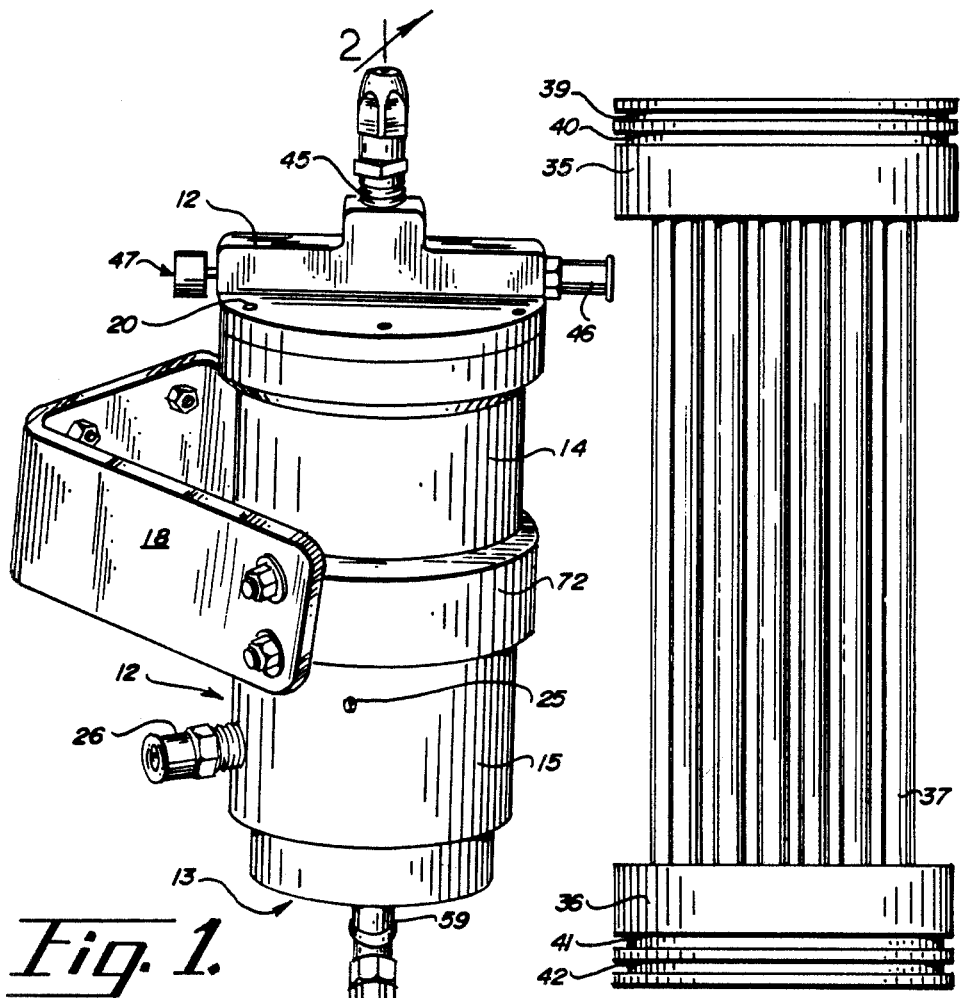
Fig. 1.
Fig. 8.
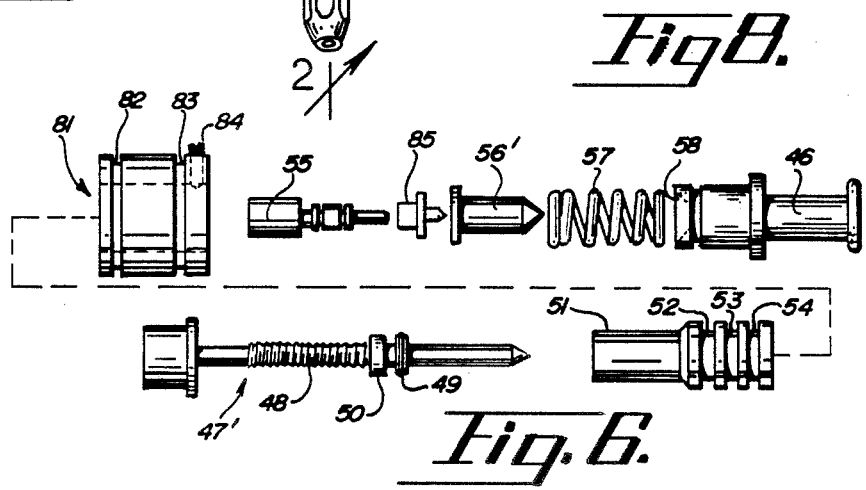
Fig. 6.

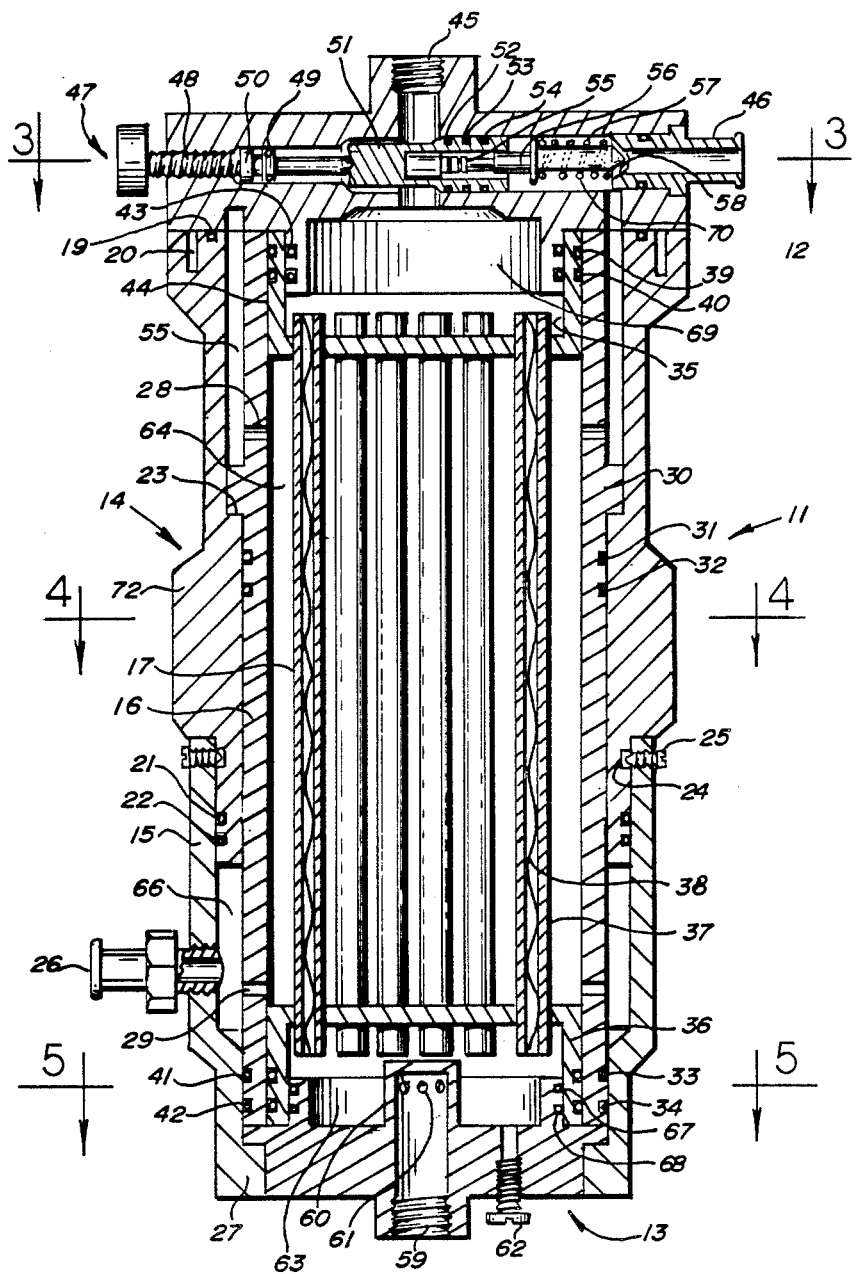

DIESEL FUEL HEATER

BACKGROUND OF THE INVENTION

This invention relates to diesel fuel engines, and more particularly, to devices that preheat diesel fuel for use in these engines.

It is well known that heating fuel prior to its introduction into the combustion chamber increases the efficiency of diesel engines There are many obstacles to overcome when designing a diesel fuel heating device. The object of these fuel heaters is to provide the combustion chamber with diesel fuel that is warmed to a predetermined temperature. The heat output of the fuel heater must be adjustable to satisfy the different amounts of fuel needed, depending on whether the truck is idling or accelerating. The fuel heater must also work within a wide range of environmental temperatures and pressures. The heat output required from the fuel heater at warm temperatures is much less than the heat output required when the outside temperature is below zero.

The fuel heaters must be inexpensive to manufacture and relatively easy to install. Savings from this type of device occur over an extended period of time due to increased fuel savings. Additionally, fuel heaters of this type decrease the amount of harmful emissions created by a diesel engine.

The prior art contains many attempts to overcome the problems faced when designing a gasoline fuel heater. In U.S. Pat. No. 4,146,002, issued to Quinn on Mar. 27, 1979, the gasoline is heated by passing it through helically shaped tubing that is surrounded by engine coolant. My prior invention, U.S. Pat. No. 4,367,717, issued Jan. 11, 1983, also utilizes engine coolant to heat the fuel. In this invention the fuel is passed through a heat exchanger which heats and regulates the fuel temperature as it passes into the automobile carburetor. Finally, my co-pending application, Ser. No. 121,672 filed on Nov. 17, 1987, now U.S. Pat. No. 4,846,137 also utilizes engine coolant to heat the gasoline prior to its introduction into the carburetor.

One attempt to overcome the many problems unique to diesel fuel heaters is disclosed in U.S. Pat. No. 4,700,047, issued to Crossett on Oct. 13, 1987. The Crosset patent discloses the use of an elongate heat exchange coil which is coiled inside a coolant containing housing. The use of a coiled heat exchange coil to transfer heat from the coolant to the fuel limits the ability of the fuel heater to heat the fuel in common winter temperatures unless the coolant is preheated or the heat exchange coil is lengthened.

The above described inventions illustrate some of the characteristics common to fuel heaters. The present invention addresses the need for a diesel fuel heater capable of overcoming the many problems unique to diesel fuel and the operating pressures of diesel engines. Therefore, due to the large number of diesel trucks present in our society and the limited fuel resources available, the need remains in the art for a diesel fuel heater which will improve combustion efficiency and decrease the amount of pollution created by these diesel engines.

SUMMARY OF THE INVENTION

An object of this invention is to produce a reliable diesel fuel heater which is adjustable to fit in any type of diesel engine compartment.

Another object of this invention is to provide a diesel fuel heater that evenly heats the diesel fuel and is capable of providing diesel fuel to the combustion chamber of the diesel engine at a predetermined temperature and reliable flow rate.

Another object of this invention is to create a diesel fuel heater that will enable the diesel engine to burn diesel fuel more efficiently and thereby reduce the amount of unburned fuel that is released into the atmosphere.

Another object of this invention is to provide a diesel fuel heater that is capable of operating at the increased fuel and coolant pressures present in diesel engines.

A feature of this invention is a two piece elongate annular section comprised of upper and lower coolant rings and having attached top and bottom covers. Inwardly from the coolant rings is a coolant distributor and a heat exchanger. The lower coolant ring cooperates with the coolant distributor to form a coolant distribution passageway near the top end of each coolant ring. The lower coolant ring includes a coolant inlet to allow coolant to pass into the interior of the diesel fuel heater. The upper coolant ring includes coolant passageways to allow the coolant to pass from the interior of the diesel fuel heater into a coolant removal chamber in the top cover.

Inwardly from the upper and lower coolant rings is the coolant distributor. The outer surface of the coolant distributor includes a pair of top and bottom O-rings and an annular obstruction to force the coolant from the coolant distribution passageway into the heat transfer chamber through the lower coolant passageways. In the heat transfer chamber of the diesel fuel heater the coolant flows across the fuel carrying fuel tubes and upwardly through the heat transfer chamber. The coolant then flows out of the heat transfer chamber through the upper coolant passageways located near the top of the coolant distributor.

The heat exchanger is located inwardly from the coolant distributor. The heat exchanger is constructed of brass or any other nonreactive metal and consists of upper and lower fuel basins. These fuel basins are connected together by numerous fuel tubes. The lower fuel basin cooperates with the bottom cover to form a lower fuel collection area. From this fuel collection area the fuel is spiraled upwardly by inserts in the fuel tubes which pass through the heat transfer chamber. From the heat transfer chamber, the fuel passes into the upper fuel basin to the top fuel collection area.

The bottom cover includes a fuel inlet which delivers unheated diesel fuel from the fuel tank into the fuel heater. In the bottom cover, a fuel distributor distributes fuel into the lower collection area. From this lower fuel collection area, the fuel flows into the fuel tubes.

The top cover attaches to the inner surface of the upper fuel basin and the top surface of the upper coolant ring. The top cover includes a fuel outlet and a coolant outlet. The top cover also includes an adjustable thermostat which expands or contracts according to the temperature of the fuel as it leaves the fuel heater. If the fuel is too hot, the thermostat will expand and prevent the coolant from flowing out of the coolant outlet. As the exiting fuel cools, the thermostat will contract and the coolant will once again flow through the fuel heater.

In operation, the diesel fuel enters the bottom of the fuel heater through the fuel inlet. The fuel then passes through the fuel distributor and into the lower fuel collection area. From the lower fuel collection area, the fuel flows into the fuel tubes where it is spiraled upwardly until it reaches the upper fuel basin. As the fuel passes through the fuel tubes, heat is transferred from the coolant to the fuel tubes, and ultimately, to the diesel fuel. From the upper fuel basin the fuel passes into the top fuel collection area and flows around the temperature sensing element of the thermostat. Finally, the heated fuel flows out of the top cover through the fuel outlet. From the fuel outlet, the fuel passes into the combustion chamber of the diesel engine.

The engine coolant enters the fuel heater through the coolant inlet located on the lower coolant ring. The coolant then passes through the lower coolant distribution passageway; through the lower coolant passageway on the coolant distributor and into the heat transfer chamber. The coolant then transfers heat to the fuel tubes and flows upwardly to the top of the heat transfer chamber. The coolant then flows out of the heat transfer chamber through the upper coolant passageways located near the top of the coolant distributor. The coolant then passes through the upper coolant distribution passageway, into the the coolant removal chamber in the top cover and past the needle valve of the adjustable thermostat. Finally, the coolant flows out of the top cover through the coolant outlet and into the engine coolant system.

An advantage of the present invention is that the fuel is evenly heated in the heat transfer chamber.

Another advantage of the present invention is that the thermostat is adjustable to account for the blend of the fuel, the outside temperature and the barometric pressure to provide the optimum fuel temperature for engine combustion.

Another advantage of this invention is that it provides increased fuel efficiency and decreases the amount of unburned fuel released into the atmosphere.

Another advantage of this invention is that it holds sufficient heated fuel in reserve so that it easily adjusts to sudden increases in the demand for fuel.

Another advantage of this invention is that it is safe to use and will shut the coolant flow off if the fuel reaches a predetermined temperature.

Another advantage of this invention is that it overcomes the many problems created by the relatively high fuel and coolant pressures used in the operation of diesel engines.

DESCRIPTION OF THE DRAWINGS

FIG. 1 is a perspective view of the diesel fuel heater;

FIG. 2 is a detailed cross-sectional view of the diesel fuel heater taken along lines 2—2 of FIG. 1;

FIG. 5 is a detailed cross sectional view of the diesel fuel heater taken along lines 5—5 of FIG. 2;

FIG. 6 is an exploded view of an alternate version of an adjustable thermostat used in the present invention;

DETAILED DESCRIPTION OF THE PREFERRED EMBODIMENT

Figure 3:
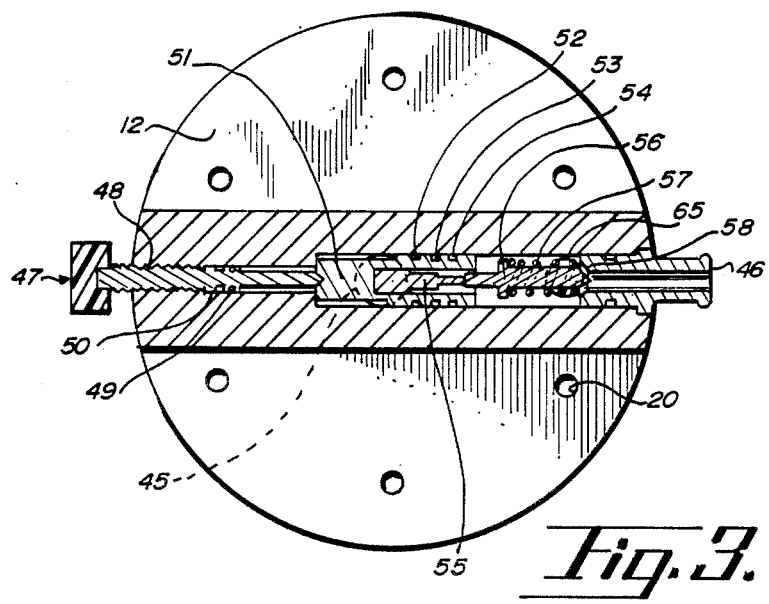
FIG. 3 is a detailed cross-sectional view of the diesel fuel heater taken along lines 3—3 of FIG. 2.
Figure 4:
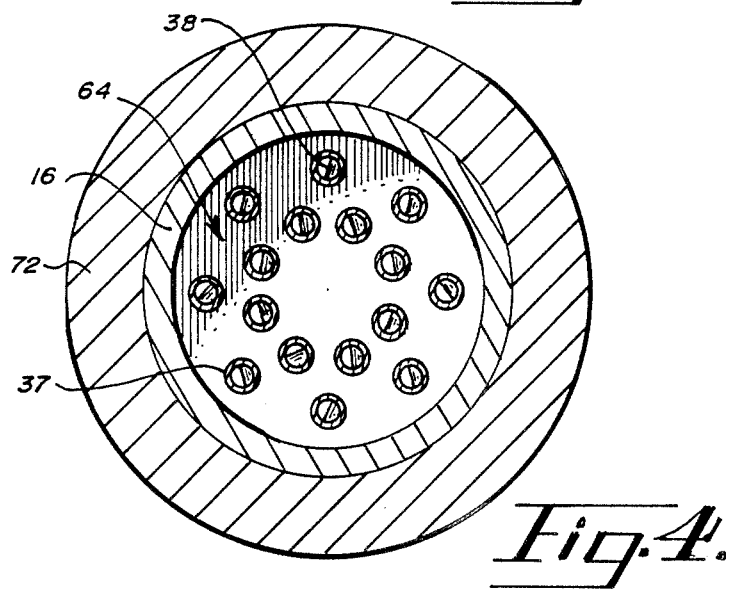
FIG. 4 is a detailed cross-sectional view of the diesel fuel heater taken long lines 4—4 of FIG. 2.
Figures 8, 9:
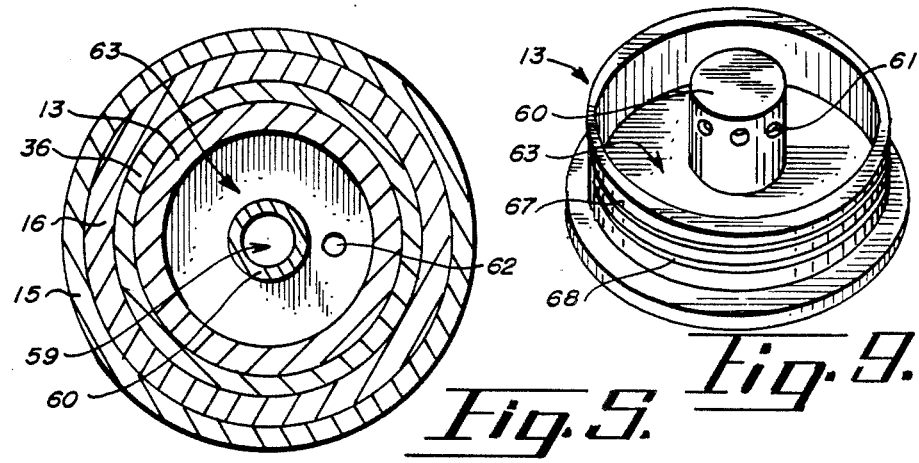
FIG. 8 is a side view of the heat exchanger of the present invention.
FIG. 9 is a perspective view of the bottom cover of the present invention.
Figure 7:
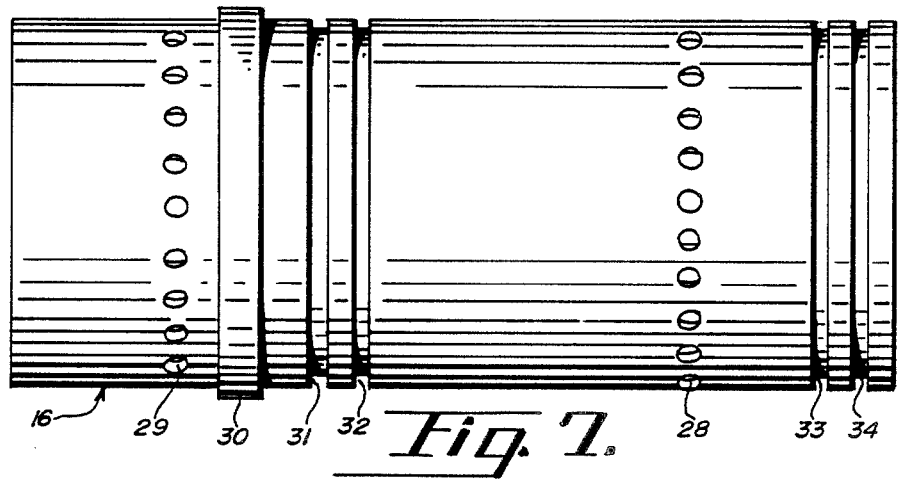
FIG. 7 is a side view of the coolant distributor of the present invention.
Figure 10:
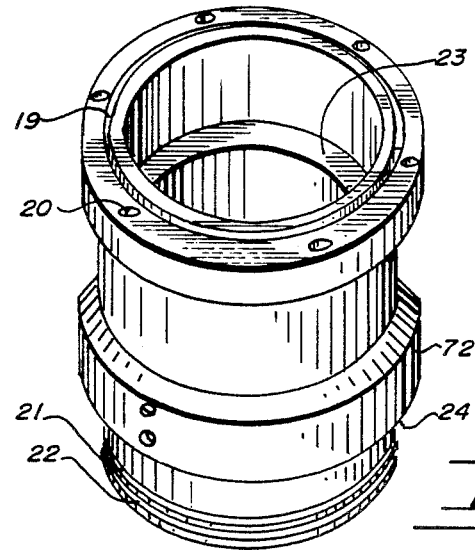
FIG. 10 is a perspective view of the upper coolant ring of the present invention.

One form of the fuel heater is described herein and is referred to generally as 10. The fuel heater 10 has as its principal parts, a central annular section 11, a top cover 12 and a bottom cover 13. The central annular section 11 is comprised to two concentric walls which, in combination with the top and bottom covers 12 and 13, create a heat transfer chamber 64. The first concentric wall is comprised of an upper coolant ring 14 and a lower coolant ring 15 which, in combination, extend from the top cover 12 to the bottom cover 13. The next concentric wall is the coolant distributor 16 which, in combination with the upper and lower coolant rings 14 and 15, form upper and lower coolant distribution passageways 55 and 66. Located inwardly from the coolant distributor 16 and extending through the heat transfer chamber 64 is the heat exchanger 17.

The upper coolant ring 14 is an elongate annular aluminum cylinder which extends from the bottom of the top cover 12 to an overlapping relationship with the lower coolant ring 15. The outer surface of the upper coolant ring 14 includes a circumferential ridge 72 for the attachment of an adjustable mounting bracket 18 thereon. The top surface of the upper coolant ring 14 includes a top annular O-ring and groove 19 to provide a leak proof seal with the top cover 12. Additionally, the top surface of the upper coolant ring 14 includes threaded openings thereon for the insertion of set screws 20 to fasten the top cover 12 onto the upper coolant ring 14. The inner surface of the upper coolant ring 14 includes a central annular ridge 23 for engagement with the outer surface of the coolant distributor 16. Positioned along the lower outer surface of the upper coolant ring 14 is a pair of O-rings and grooves 21 and 22 which, in combination with the lower inner surface of the lower coolant ring 15, form a leak-proof seal. Positioned immediately above the O-ring and grooves 21 and 22, is a lower annular ridge 24 which, in combination with set screws 25, enables the lower coolant ring 15 to be rotatably attached to the upper coolant ring 14.

The lower coolant ring 15 is another elongate aluminum cylinder which extends from an overlapping relationship with the upper coolant ring 14 to the bottom cover 13. The lower coolant ring 15 includes a coolant inlet 26 and may be rotated to position the coolant inlet 26 for the convenient attachment of the fuel heater 10 to the diesel engine's pre-existing coolant system. The inner surface of the bottom of the lower coolant ring 15 includes an annular bottom cover ridge 27 which circumferentially engages the bottom cover 13.

The next concentric wall in the central annular section 11 is the coolant distributor 16. This wall is constructed of aluminum and contains evenly spaced upper and lower coolant passageways 28 and 29 which open into the heat transfer chamber 64. The outer surface of the coolant distributor 16 includes an annular distributor ridge 30 which rests on the central annular ridge 23 of the upper coolant ring 14. The coolant distributor 16 is further held in position by a pair of centrally located O-rings and grooves 31 and 32 which engage the inner surface of the upper coolant ring 14 to form a leak proof seal between the coolant distributor 16 and the upper coolant ring 14. The lower outer surface of the coolant distributor 16 includes a pair of bottom O-rings and grooves 33 and 34 which engage the inner surface of the lower coolant ring 15 to create a leak proof seal between the coolant distributor 16 and the lower coolant ring 15.

Located inwardly from the coolant distributor 16 is the heat exchanger 17. The heat exchanger 17 is preferably constructed of brass or other nonreactive material and consists of a top fuel basin 35, a bottom fuel basin 36 and centrally located fuel tubes 37. In the present invention, at least 16 fuel tubes 37 are arranged in a pair of evenly spaced circular rows. The top and bottom fuel basins 35 and 36, respectively, in combination with the coolant distributor 16, form the heat transfer chamber 64. The fuel tubes 37 extend upwardly from the bottom fuel basin 36; through the heat transfer chamber 64 and into the top fuel basin 35. The top fuel basin 35 is held in position by a pair of top O-rings and grooves 39 and 40 which engage the inner surface of the coolant distributor 16 to form a leak proof seal between the heat exchanger 17 and the coolant distributor 16. The bottom fuel basin 36 includes a pair of bottom O-rings and grooves 41 and 42 which engage the inner surface of the coolant distributor 16 to form a leak proof seal between the bottom of the heat exchanger 17 and the coolant distributor 16.

The bottom cover 13 is constructed of aluminum and includes the fuel inlet 59. A fuel distributor 60 is in flow communication with the fuel inlet 59 and consists of a top, flat surface and horizontally oriented fuel passageways 61. Located on the inner, bottom surface of the bottom cover 13 is a condensation plug 62 to remove condensation from the lower fuel collection area 63. The bottom cover 13 is held in position by a pair of O-rings and grooves 67 and 68 which engage the inner surface of the bottom fuel basin 36 to form a leak proof seal between the bottom cover 13 and the bottom fuel basin 36.

The top cover 12 is preferably constructed of aluminum and includes a fuel outlet 45, a coolant outlet 46 and an adjustable thermostat 47. The adjustable thermostat 47 monitors the temperature of the diesel fuel and limits the flow of coolant through the coolant outlet 46. The adjustable thermostat 47 includes a threaded adjusting screw 48 which extends inwardly into the top cover 12 and has an O-ring 49 and adjustment collar 50 which act in combination to limit the movement of adjusting screw 48 and prevents the flow of fuel out of the fuel heater 10 through the opening for adjusting screw 48. Inwardly from the adjusting screw 48 is an adjustment collar 50 which includes three sealing O-rings 52, 53 and 54 which act in combination with the top cover 12 to prevent the flow of fuel into the coolant removal chamber 70. The heat sensor 51 is inserted into the end of adjustment collar 50 and extends outwardly from the adjustment collar 50 a sufficient distance to engage the power pill 55. The power pill 55 expands and contracts according to the temperature of the fuel and as the power pill 55 expands, it moves the needle valve 56. The needle valve 56 extends into the needle valve housing 58 located on the coolant outlet 46 and includes a tension spring 57.

In operation, the fuel flows into the fuel heater 10 through fuel inlet 59. The fuel then flows into the fuel distributor 60 and through the fuel passageways 61. The fuel passageways 61 force the fuel to flow horizontally into the lower fuel collection area 63. The fuel tubes 37 extend into the lower fuel collection area 63 a slight distance to prevent the fuel from flowing at varying rates into the individual fuel tubes 37. The fuel heater 10 optimally includes at least 16 fuel tubes 37 which act in combination to decrease the flow rate and pressure of the fuel as the fuel passes through the heat transfer chamber 64. Inside each fuel tube 37 is a tube insert 38 which spirals the fuel through the fuel tube 37 and thereby provides a more efficient transfer of heat from the coolant to the fuel. Once the fuel passes through the fuel tubes 37, it passes into the top fuel basin 35. The top fuel basin 35 and the top cover 12 form the top fuel collection area 69 to collect the heated fuel and return the fuel to its original pressure and flow rate. From the top fuel collection area 69, the fuel flows across the adjustment collar 50 and heats the heat sensor 51 located in the top cover 12. The fuel then flows out of the fuel heater 10; through the fuel outlet 45 and ultimately into the combustion chamber of the diesel engine.

The coolant enters the fuel heater 10 through the coolant inlet 26 located on the lower coolant ring 15. The coolant then flows through the lower coolant distribution passageway 66 and into the lower coolant passageways 29 located on the coolant distributor 16. Once the coolant flows through the lower coolant passageways 29 it enters the heat transfer chamber 64. In the heat transfer chamber 64, the coolant passes across the outer surface of the fuel tubes 37 to transfer the heat from the coolant to the fuel tubes 37 and heats the fuel. The coolant flows upwardly through the heat transfer chamber 64 so that the hottest coolant contacts the coolest fuel at the lower end of the heat transfer chamber 64; as the coolant and fuel pass into the upper end of the heat transfer chamber 64, the temperature of the coolant will decrease and the temperature of the fuel will have increased. The coolant passes from the heat transfer chamber 64 into the upper coolant distribution passageway 55 through the upper coolant passageways 28 located near the top end of the coolant distributor 16. The coolant flows upwardly from the upper coolant distribution passageway 65 into the annular coolant flow ring 73 located on the bottom surface of the top cover 12. The coolant then contacts the power pill 55 and needle valve 56 in the coolant removal chamber 70 before it leaves the fuel heater 10 through the needle valve housing 58 located on the coolant outlet 46.

The alternate version of the adjustable thermostat 47' is illustrated in FIG. 6. This embodiment includes an insulator ring 81 and a needle valve insulator 85. The adjustable thermostat 47' may be used as illustrated in FIGS. 2 and 3 by merely enlarging the thermostat opening in the top cover 12 adjacent the fuel outlet 45. The insulator ring 81 surrounds the end of the heat sensor 51 which is inserted into the thermostat opening of the top cover 12 and is held in position by O-rings and grooves 82 and 83 and set screw 84. This limits the amount of heat transferred from the fuel to the power pill 55 through the top cover 12. Additionally, in the alternate adjustable thermostat 47', a needle valve insulator 85 replaces the part of needle valve 56 adjacent the power pill 55 thereby decreasing the amount of heat transferred from the power pill 55 to the modified needle valve 56'.

The operation of this fuel heater 10 provides, as it primary advantages, fuel economy and decreased fuel emissions. Additionally, this invention overcomes the problems of the higher operating pressures of coolant and diesel fuel in diesel engines. The use of the adjustable thermostat 47 provides a fuel heater 10 which may be manually adjusted to provide the optimum combustion temperature for the diesel fuel. Additionally, once the adjustable thermostat 47 is set at its predetermined adjustment, the adjustable thermostat 47 will regulate the fuel temperature by increasing or decreasing the flow of coolant through the fuel heater 10 according to the temperature of the heated fuel.

During testing of the fuel heater 10 it has been found that the flow of coolant may be modified to have the coolant flow into the fuel heater 10 through the coolant outlet 46 and out of the fuel heater 10 through the coolant inlet 26. Changing the flow of coolant through the fuel heater 10 provides a fully operational fuel heater 10 which is only slightly less efficient than the preferred embodiment described above. It is fully anticipated that this and other modifications may be made without departing from the scope of the present invention which is to be determined by the claims attached hereto.

What is claimed:

1. A fuel heating attachment for heating fuel with engine coolant, comprising
   an elongate annular section forming an annular side wall upon which transverse top and bottom covers are attached,
   an elongate coolant distributor within the annular section having coolant passageways therein and extending from the top cover to the bottom cover,
   a heat exchanger having top and bottom ends located inwardly from the coolant distributor and extending from the top cover to the bottom cover,
   said heat exchanger including a plurality of fuel tubes which extend through a heat transfer chamber formed by the inner surface of the coolant distributor and the top and bottom ends of the heat exchanger,
   said fuel tubes extending through said heat transfer chamber to enable the coolant to flow around the outer surface of the fuel containing fuel tubes to heat the fuel tubes and fuel, the fuel tubes including a spiral insert for spiraling the fuel through the fuel tubes,
   a fuel inlet on the fuel heater for directing fuel into the fuel heater,
   a fuel outlet for directing heated fuel from the fuel heater,
   a coolant inlet on the fuel heater for directing coolant into the fuel heater,
   coolant outlet on the fuel heater for directing coolant from the fuel heater,
   a temperature sensing means for monitoring the temperature of the heated fuel and regulating the flow of coolant through the fuel heater.

2. The fuel heater of claim 1, wherein the tempemature sensing means includes a thermostat located in the top cover which is in a flow communicating relationship with the fuel and the coolant.

3. The fuel heater of claim 1, wherein the fuel tubes extend upwardly from the bottom end of the heat exchanger to the top end of the heat exchanger to enable the coolant to flow across the outer surface of the fuel tubes as the coolant flows through the heat transfer chamber.

4. The fuel heater of claim 1, wherein the fuel tubes of the heat exchanger extend downwardly beyond the bottom end of the heat exchanger into a fuel collection area formed by the bottom end of the heat exchanger and the bottom cover.

5. The fuel heater of claim 1, wherein the bottom cover further comprises a fuel inlet and a fuel distributor for evenly distributing the fuel into the fuel collection area.

6. The fuel heater of claim 5, wherein the bottom cover further includes a condensation plug for removing condensation from the fuel heater.

7. The fuel heater of claim 1, wherein the elongate annular section is comprised of upper and lower coolant rings.

8. The fuel heater of claim 7, wherein the lower coolant ring includes a coolant inlet, and in combination with the coolant distributor, forms a coolant distribution passageway for directing coolant into the heat transfer chamber through the coolant passageways.

9. The fuel heater of claim 1 wherein the top cover includes a fuel outlet, a coolant outlet and a thermostat in flow communication with the heated fuel and coolant.

10. The fuel heater of claim 9, wherein the top cover in combination with the top end of the heat exchanger forms a fuel collection area for the collection of heated fuel after the fuel passes through the fuel tubes.

11. The fuel heater of claim 2, wherein the temperature sensing means is an adjustable thermostat for adjusting the flow of coolant through the fuel heater to account for certain external factors including blend of fuel, outside temperature and barometric pressure.

12. The fuel heater of claim 1, wherein the elongate annular section includes a mounting bracket mounted thereon for mounting the fuel heater in the engine compartment.

13. A fuel heating attachment for heating fuel with engine coolant, comprising
   top and bottom covers transversely enclosing an elongate annular section,
   said elongate annular section comprising upper and lower coolant rings,
   an elongate coolant distributor positioned inwardly from the annular section and extending from the top cover to the bottom cover,
   said coolant distributor having a plurality of upper and lower coolant passageways therein,
   said coolant distributor and lower coolant ring forming a lower coolant distribution passageway for the flow of coolant therein,
   a heat exchanger having a plurality of fuel tubes and transversely facing top and bottom ends,
   said fuel tubes extending between the top and bottom ends of the heat exchanger and through a heat transfer chamber formed by the coolant distributor and the top and bottom ends of the heat exchanger, the coolant flowing around the outer surface of the fuel tubes in the heat transfer chamber, the fuel being heated as it flows through the fuel tubes, the fuel tubes having spiral inserts to spiral the fuel as it passes through the fuel tubes,
   a fuel inlet on the bottom cover for directing fuel into the bottom cover of the fuel heater,
   a fuel distributor on the bottom cover for evenly directing fuel from the fuel inlet to the fuel tubes,
   a fuel outlet on the top cover of the fuel heater to direct heated fuel from the fuel heater,
   a coolant inlet for directing coolant into the fuel heater, a coolant outlet for directing coolant from the fuel heater, a temperature sensing means for monitoring the temperature of the heated fuel, and a flow regulating means for regulating the flow of the coolant through the fuel heater.

14. The fuel heater of claim 13, wherein the coolant inlet is located on the lower coolant ring and the coolant outlet is located on the top cover.

15. The fuel heater of claim 13, wherein the coolant inlet is located on the top cover and the coolant outlet is located on the lower coolant ring.

16. The fuel heater of claim 13, wherein the temperature sensing means is an adjustable thermostat located in the top cover.

* * * * *

UNITED STATES PATENT AND TRADEMARK OFFICE
CERTIFICATE OF CORRECTION

PATENT NO. : 4,971,018

DATED : November 20, 1990

INVENTOR(S) : Dennis A. Ray

It is certified that error appears in the above-identified patent and that said Letters Patent is hereby corrected as shown below:

At column 6, line 41, delete "55" and substitute --65--.

At column 7, line 52, before "coolant" (first occurrence) insert --a--.

Signed and Sealed this

Twelfth Day of January, 1993

Attest:

DOUGLAS B. COMER

*Attesting Officer*

Acting Commissioner of Patents and Trademarks